United States Patent
Kato et al.

(10) Patent No.: US 7,959,175 B2
(45) Date of Patent: Jun. 14, 2011

(54) TORSION BEAM SUSPENSION (75) Inventors: Yoshihisa Kato, Nishikamo-gun (JP);
Yoshiharu Isoshima, Okazaki (JP);
Yoshiaki Kadoma, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/521,811

(22) PCT Filed: Feb. 13, 2008

(86) PCT No.: PCT/JP2008/052792
§ 371 (c)(1),
(2), (4) Date: Jun. 30, 2009

(87) PCT Pub. No.: WO2008/108166
PCT Pub. Date: Sep. 12, 2008

(65) Prior Publication Data
US 2010/0059961 A1    Mar. 11, 2010

(30) Foreign Application Priority Data
Mar. 1, 2007 (JP) .................................. 2007-051956

(51) Int. Cl.
*B60G 11/18* (2006.01)
(52) U.S. Cl. .............................................. 280/124.166
(58) Field of Classification Search ........... 280/124.166, 280/124.106, 124.128, 124.153
See application file for complete search history.

(56) References Cited

U.S. PATENT DOCUMENTS

| 4,787,680 | A | | 11/1988 | Bonjean et al. | |
|---|---|---|---|---|---|
| 5,409,254 | A | * | 4/1995 | Minor et al. | 280/124.166 |
| 6,099,084 | A | | 8/2000 | Bungarten et al. | |
| 2002/0167148 | A1 | * | 11/2002 | Cho | 280/124.166 |
| 2006/0131829 | A1 | * | 6/2006 | Alesso et al. | 280/124.166 |

FOREIGN PATENT DOCUMENTS

| EP | 1 338 447 | 8/2003 |
|---|---|---|
| JP | 62 299402 | 12/1987 |
| JP | 7 71883 | 3/1995 |
| JP | 2000 301251 | 10/2000 |
| JP | 2000 318420 | 11/2000 |
| JP | 2002 127724 | 5/2002 |
| JP | 2003-341327 | 12/2003 |
| JP | 2006 281885 | 10/2006 |
| JP | 2008-87612 | 4/2008 |

OTHER PUBLICATIONS

Office Action issued Nov. 25, 2010, in Chinese Patent Application No. 200880001520.7.

* cited by examiner

*Primary Examiner* — Faye M. Fleming
(74) *Attorney, Agent, or Firm* — Oblon, Spivak, McClelland, Maier & Neustadt, L.L.P.

(57) ABSTRACT

A torsion beam type suspension including a torsion beam in which arms are formed by bending both ends of a pipe material and also includes wheel installation members fixed to the arms, respectively. Portions to be inserted of the wheel installation members are inserted into open ends of the arms, and the wheel installation members are welded to the arms. The torsion beam type suspension can be produced at low cost and have high quality.

9 Claims, 9 Drawing Sheets

FIG. 9

TORSION BEAM SUSPENSION

BACKGROUND OF THE INVENTION

1. Field of the Invention

The present invention relates to a torsion beam suspension, in detail, the construction of attachments to the wheels set to the both ends of the torsion beam extended to the vehicle width direction.

2. Related Art

Conventionally, some prior arts disclose some torsion beam suspensions, there is known various technology referring to the torsion beam suspension (for example, see JP-U-7-71883 and JP-A-62-299402).

The conventional torsion beam suspension is composed of a torsion beam and attachments to a body, disclosed JP-U-7-71883 and JP-A-62-299402. The torsion beam is constructed as a single pipe, which includes a cross portion and an arm, and the cross portion is extended in the vehicle width direction and the arm is extended from the both end of the cross portion to the longitudinal direction of the vehicle intermediary of a curving portion. The attachments are respectively fixed to the curving portion.

Attachments to the wheels are set in the opposite end of the curving portion of the arm, intermediary of an axis. On the other hand, a tube bush portions are set in the opposite end of the curving portion of the attachments, the bush portions are rotatably attached to the axis member of the vehicle body.

Figure 8:
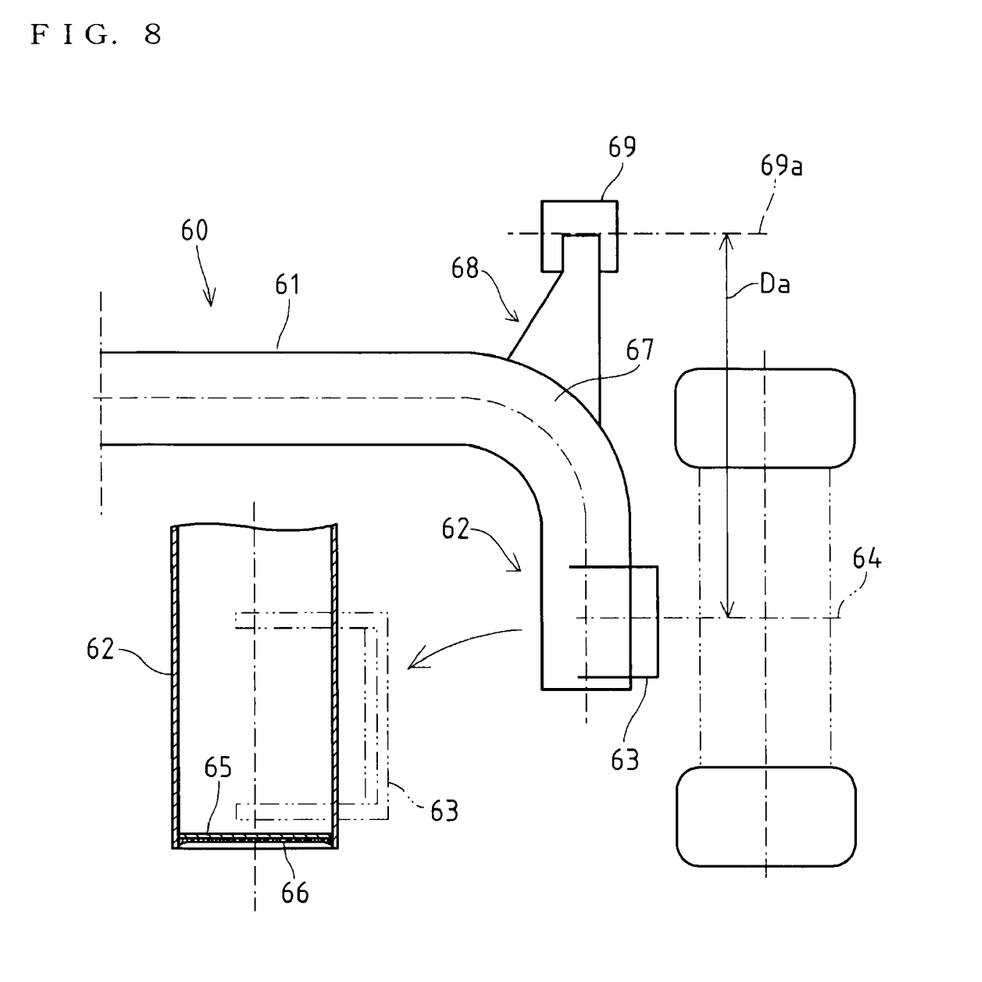
FIG. 8 is a view showing a conventional torsion beam.

The construction of the conventional torsion beam suspension will be described with reference to the drawings. As shown in FIG. 8, a torsion beam 60 includes an arm 62 and attachments 63, the arm 63 is formed by bending the ends of a straight pipe 61 to the nearly right-angle direction, the each attachment 63 is set to the end of the arm 62, and an axis 64 is set to the attachment 63. An attachment 68 is attached to a curving portion 67 between the pipe 61 and the arm part 62.

Figure 9:
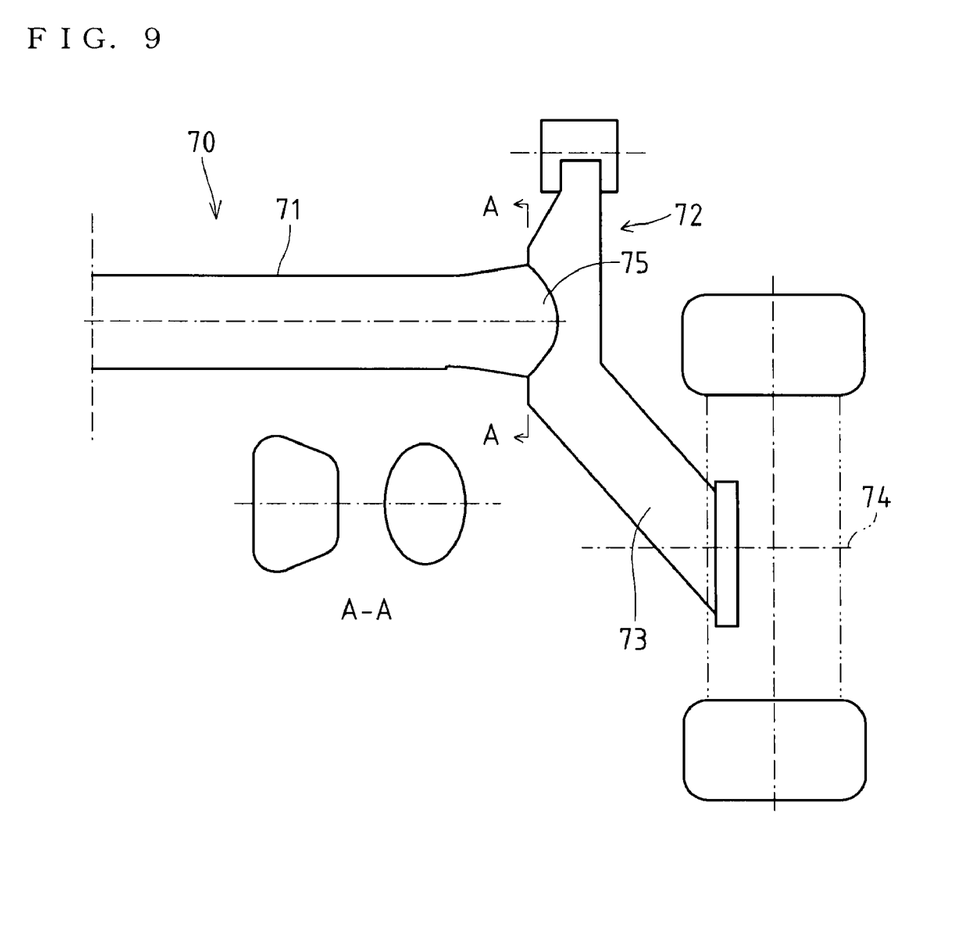
FIG. 9 is a view showing the other conventional torsion beam.

The other embodiment of the conventional torsion beam suspension will be described. As shown in FIG. 9, a torsion beam 70 includes a straight pipe 71 and attachments 72, the attachments 72 are attached to the both ends of the straight pipe 71 and the each attachment 72 is formed directing to the longitudinal direction of the vehicle and thus configures an arm 73. An axis 74 is set to the arm 73.

In the torsion beam suspension shown in FIG. 8, it is necessary that the arm 62 should be reached to the axis 64 with bending the pipe 61, so that the long pipe 61 is required, which is more expensive than a steel plate, thereby requiring the high material cost.

Further in the torsion beam suspension shown in FIG. 8, it is also necessary that the ends of the arm 62 should be closed by a cap 65 with the welding 66, as shown in FIG. 8, because the inner of the pipe goes rusty from the open ends if the arm part 62 has the open ends. Such construction unfortunately causes the high cost in manufacturing and attaching of the cap.

As to the torsion beam suspension shown in FIG. 8, it is required that the dimension between the axis 64 and the center 69a of a bush-part 69 provided in the end of the attachment 68 is exactly set as the specified dimension, however, the accuracy of bending the pipe 61 reflects that of setting the axis 64, so that the bending is required with high accuracy.

In the light of the strength of the torsion beam suspension shown in FIG. 9, the ends of the pipe 71 should be formed trapezoid or ellipse in section, or should be trimmed for forming the wrap-part 75 for the attachments 72 so that manufacturing cost of the pipe 71 becomes higher. The trimming causes the remainder of the pipe 71, thereby causing the low yield rate.

The torsion beam suspension shown in FIG. 9 requires high accuracy with setting of the attachments 72 and the wrap-part 75, because the burn through or the strength reduction of weld is caused if the clearance exists between the wrap-part 75 and the attachments 72.

The purpose of the invention is to provide a new torsion beam suspension, in which the manufacturing cost reduction and providing the good quality manufacture are achieved, in the light of the above problems.

SUMMARY OF THE INVENTION

A torsion beam suspension of the first aspect of the present invention, includes a torsion beam having arms formed by bending both ends of a pipe and wheel attachments inserted to the each arms, in which a portion of the wheel attachment is inserted to an open end of the arm and wheel attachments are welded to the arms.

Due to the above structure, the arm can be shortened by the length of the wheel attachment. Thus, the pipe can be shortened, which is more expensive than a steel plate, so that the material cost can be reduced. Furthermore, in the step before welding, the position of the arm can be adjusted. Thus, the manufacture accuracy of the torsion beam can be higher.

Preferably, in the torsion beam suspension of the present invention, the weld is carried out between the inner peripheral of the open end of the arm and the outer peripheral of the portion of the wheel attachment.

Due to the above structure, the weld is carried out in the wrap-part formed between the portion and the arm, so that the problems are prevented such as the burn through or poor strength. Thus, the weld quality as well as the product quality of torsion beam suspension can be improved.

Preferably, in the torsion beam suspension of the present invention, the open end of the arm is closed by the wheel attachment.

Due to the above structure, the inner of the arm can be prevented from rusting by the wheel attachment, without the rust resisting or the other member. Thus, the cost of them is cut.

Preferably, in the torsion beam suspension of the present invention, the wheel attachment includes a carrier plate for fixing a wheel carrier, wherein the carrier plate has a hole penetrated thereto in the vehicle width direction; and a carrier bracket including a first portion inserted to the each open end of the arms and a second portion fixed to the carrier plate, wherein an open portion is formed in the second portion and the open portion and the hole construct a shaft-penetrated portion.

Due to the above structure, the rear-wheel drive vehicle can be achieved.

Preferably, in the torsion beam suspension of the present invention, the first portion has an edge, and a diameter of the edge is the smallest in that of the first portion.

Due to the above structure, the working performance can be improved, when the portion is inserted to the open portion of the arm.

DETAILED DESCRIPTION OF THE INVENTION

Figure 1:
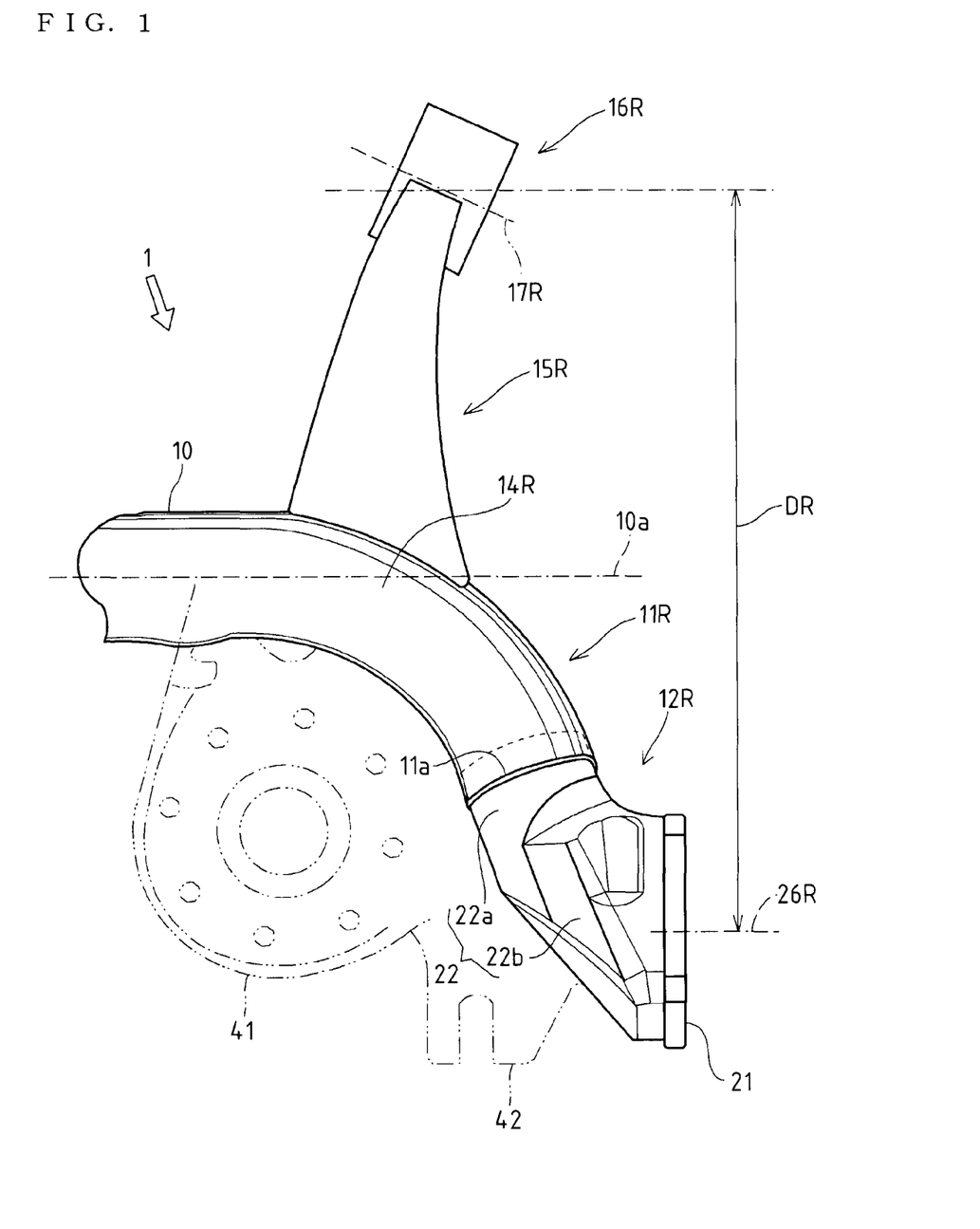
FIG. 1 is a view showing a torsion beam and a wheel attachment.

As shown in FIG. 1, a torsion beam 1 includes an arm 11R and a wheel attachment 12R, the arm is formed by bending the end of a pipe 10, the attachment has a portion 22a inserted to the open end 11a of the arm 11R.

As shown in FIG. 1, the pipe 10 is bent such that the arm 11R is directed to the rear of the vehicle on the state where the torsion beam 1 is set to the vehicle. In FIG. 1, the upper side shows the front of the vehicle, and the lower side shows the rear of the vehicle, and the arm 11R is bent rearward and in rear of the axis 10a of the pipe 10. The open end 11a of the arm 11R is disposed in front of an axle 26R. Due to the above structure, the arm 11R can be shortened.

Figure 2:
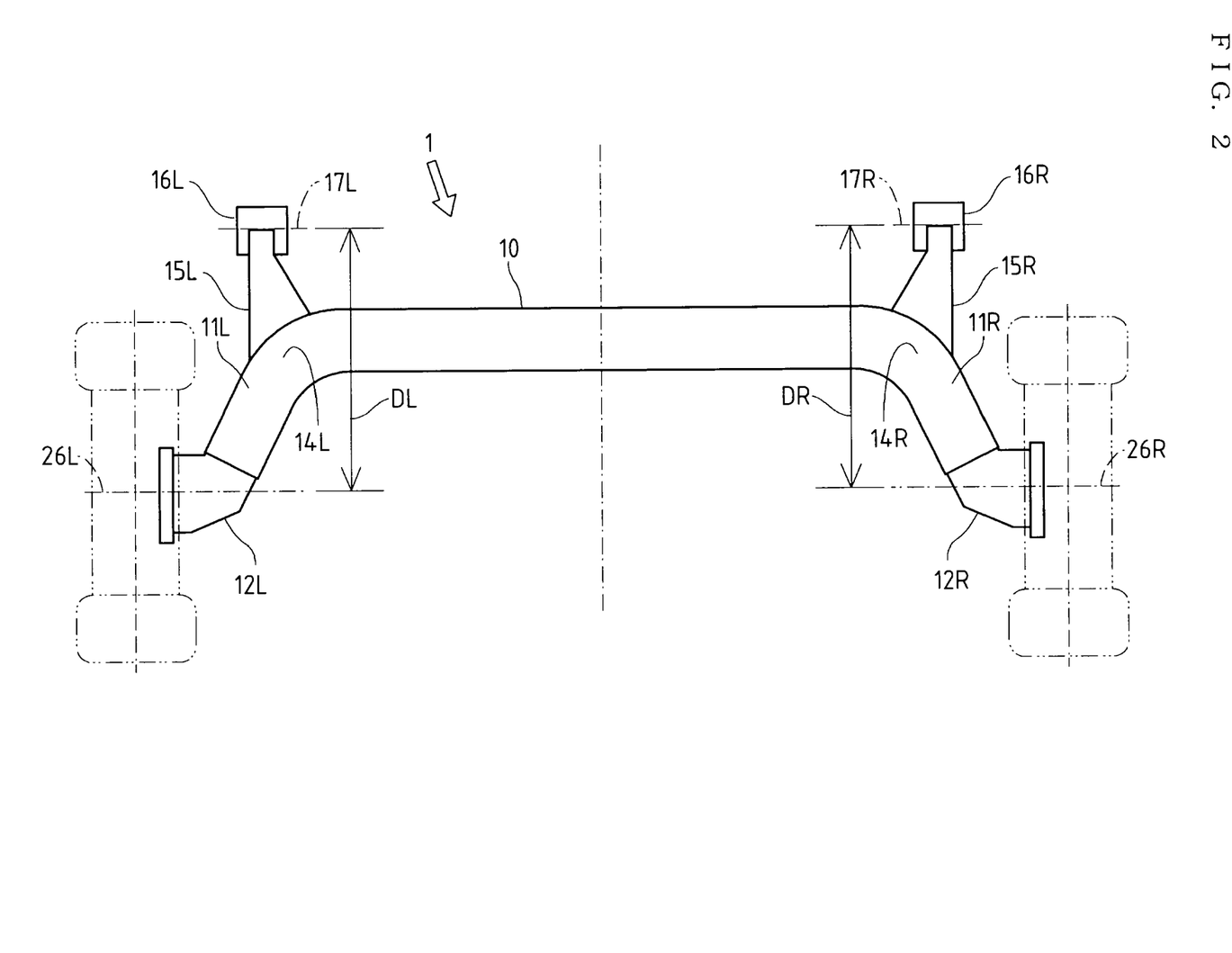
FIG. 2 is a view showing a whole of the torsion beam to which the attachments attached.

The right side of the vehicle is shown in FIG. 1, the above-mentioned structure is applied to the both side of the vehicle as shown in FIG. 2. The torsion beam 1 includes body attachments 15R and 15L for the vehicle body welded to curved portions 14R and 14L, respectively, which are made by bending the pipe 10, and bush portions 16R and 16L set at the each end of the attachments 15R and 15L pivoted to the axis-part (not shown) of the vehicle. Due to the above structure, the torsion beam 1 is attached to the vehicle rotatably.

As shown in FIG. 1, the open end 11a of the arm 11R is not manufactured against the end of the pipe 10, namely the open end 11a is not deformed and is same one before the pipe 10 is bent, so that the manufacturing cost is reduced.

Figure 3:
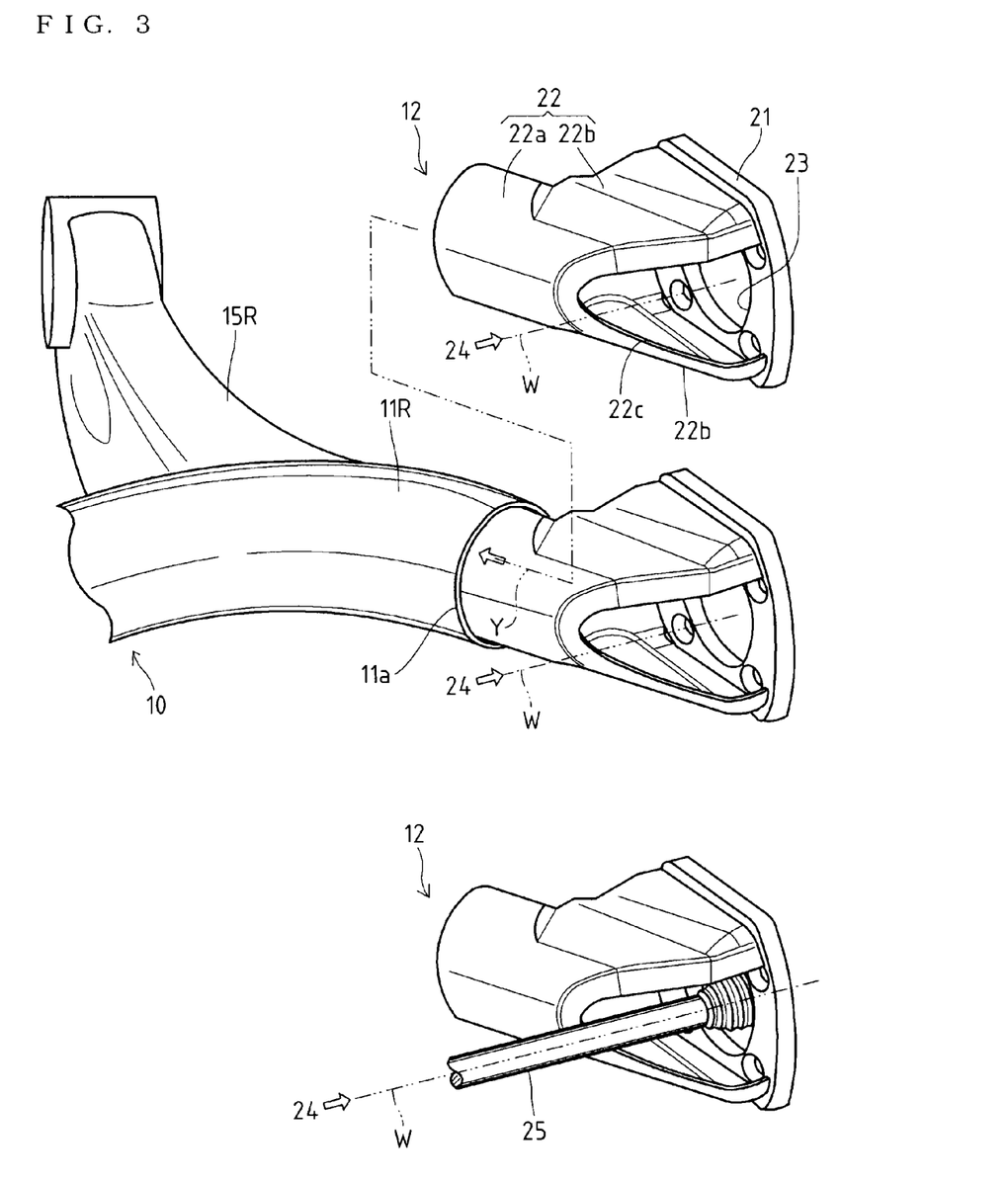
FIG. 3 is a view showing a detail of the attachment.

As shown in FIGS. 1 and 3, the attachment 12R includes a carrier plate 21 for fixing a wheel carrier (not shown) and a carrier bracket 22. The attachment 12R supports a spring seat 41 and a portion of an absorber bracket 42.

As shown in FIG. 3, the carrier plate 21 has a hole 23 penetrated thereto in the vehicle width direction W. The vehicle width direction W goes through the carrier plate 21. It should be noted that the component of the carrier plate 21 is limited particularly. The centers of the hole 23 and the wheel carrier may be the same position, so that the carrier plate 21 can be small and light. Thus, the other parts of the torsion beam suspension are designed more freely.

As shown in FIGS. 1 and 3, the carrier bracket 22 includes an inserted portion 22a and a fixing portion 22b, the portion 22a is inserted to the open end 11a, and the portion 22b extends toward outside of the vehicle width direction from the portion 22a and has the end fixed to the carrier plate 21. The portion 22b is disposed as the carrier plate 21 directing to the vehicle width direction W.

Figure 4:
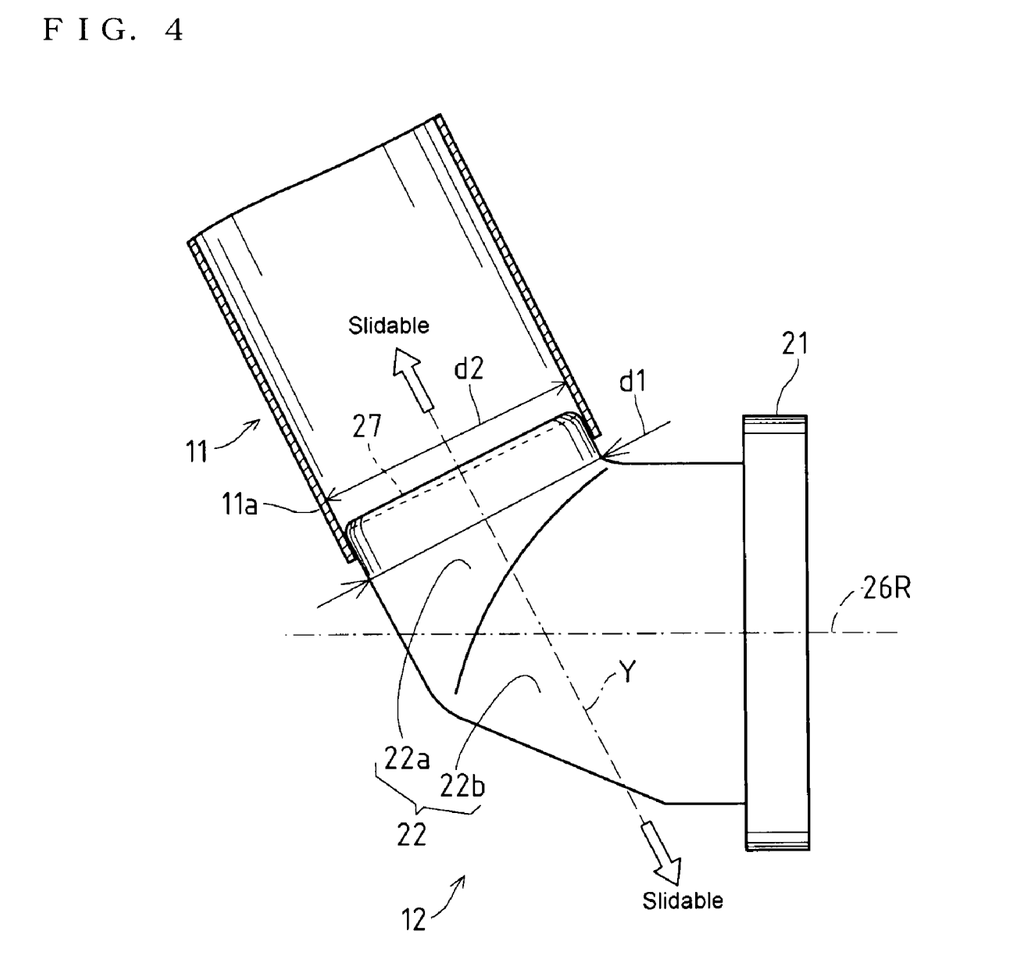
FIG. 4 is a view showing the attachment inserted to an arm.

As shown in FIG. 4, the portion 22a is a tube with external diameter d1. The diameter d1 is slightly smaller than the internal diameter of the open end 11a, so that the portion 22a is inserted into the open end 11a slidably. Due to the above structure, the attachment 12R can slide in the axis direction Y of the arm 11R. Furthermore, the attachment 12R is inserted to the open end 11a of the arm 11R from the rear of the vehicle, so that the open end 11a is disposed in front of the axle 26R in the longitudinal direction of the vehicle (see FIG. 1).

Figure 5:
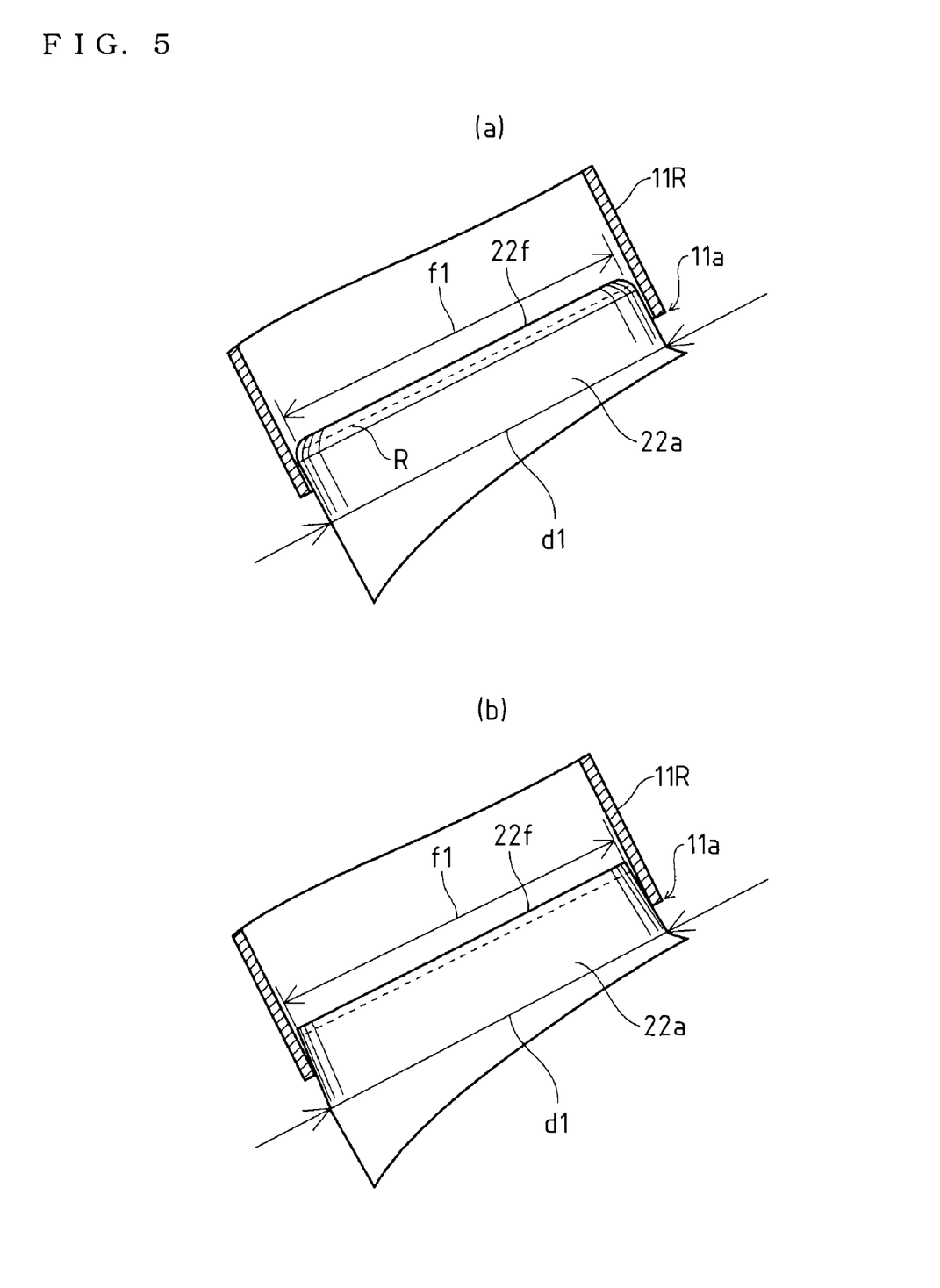
FIG. 5(a) is a view showing the edge of the portion formed with a corner R.
FIG. 5(b) is a view showing the alternative edge of the portion formed tapered.

As shown in FIG. 5(a), the edge 22f of the portion 22a inserted to the open end 11a is formed by the diameter f1. The diameter f1 is smaller than the diameter d1.

As shown in FIG. 5(a), the edge 22f has the corner R, so that the diameter of the edge 22f is smaller than the diameter d1. Alternatively, in the structure shown in FIG. 5(b), the portion 22a is formed tapered, so that the diameter of the edge 22f is smaller than the diameter d1.

Due to the above structure, the clearance exists between the interior of the open end 11a and the diameter of the end 22f. Thus, the portion 22a can be inserted to the arm 11R smoothly. As a result, the working performance can be improved when the portion 22a is inserted to the open end 11a.

As shown in FIG. 4, the portion 22a covers the open end 11a. The carrier bracket 22 is pipe and includes the portion 22a and a cap 27, the cap is fixed to the portion 22a, so that the open end 11a is covered with the portion 22a. Due to the above structure, the inner of the arm 11R can be prevented from rusting, by inserting the attachment 15R to the arm 11R.

As shown in FIG. 3, the open portion 22c is formed in the portion 22b of the carrier bracket 22. The open portion 22c and the penetrate hole 23 construct a shaft-penetrated portion 24. The open portion 22c is formed in the rear side of the vehicle. Especially in the portion 22b, the open portion 22c is not formed in the side that the portion 22a is disposed, so that the portion 22a of the carrier bracket keeps rigidity.

As shown in FIG. 3, the shaft-penetrated portion 24 is formed in the carrier plate 21 and carrier bracket 22 (the portion 22b). The rear-wheel drive vehicle can be achieved in which a drive shaft 25 is penetrated to the shaft-penetrated portion 24. For example, the carrier bracket provided with the shaft-penetrated portion 24 is applied to either the front-wheel drive vehicle or four-wheel drive vehicle. Thus, the carrier bracket can be shared, so that easy management and cost reduction is achieved. The size of the penetrate hole 23 and the open portion 22c may be designed considering the diameter of the drive shaft 25, the way to attach the drive shaft, and the rigidity of the each component.

The assembly of the torsion beam 1 will be described.

As shown in FIG. 2, the arms 11R, 11L are formed by bending both ends of the pipe 10, and the attachments 12R, 12L are inserted to the each open end 11a. In this situation, the attachments 12R and 12L can move in the pipe axis direction Y (see FIG. 4). According to the above structure in FIG. 5(a) or 5(b), the structure in which the attachments 12R and 12L are inserted to the arms 11L and 11R is achieved easily.

As shown in FIG. 2, the attachments 15R and 15L are arranged against the curved portions 14R and 14L, and the positions of the attachments 12R, 12L, 15R and 15L with respect to the pipe 10 are adjusted. In this adjustment, the attachments 12R and 12L are set to the fixing jig (not shown), and also the attachments 15R and 15L are set to the fixing jig (not shown). Thus, the dimensions DR, DL between the axles 26R, 26L fixed to the attachments 12R, 12L and the centers 17R, 17L of the bush portions 16R, 16L are set in the specified dimensions.

Figure 6:
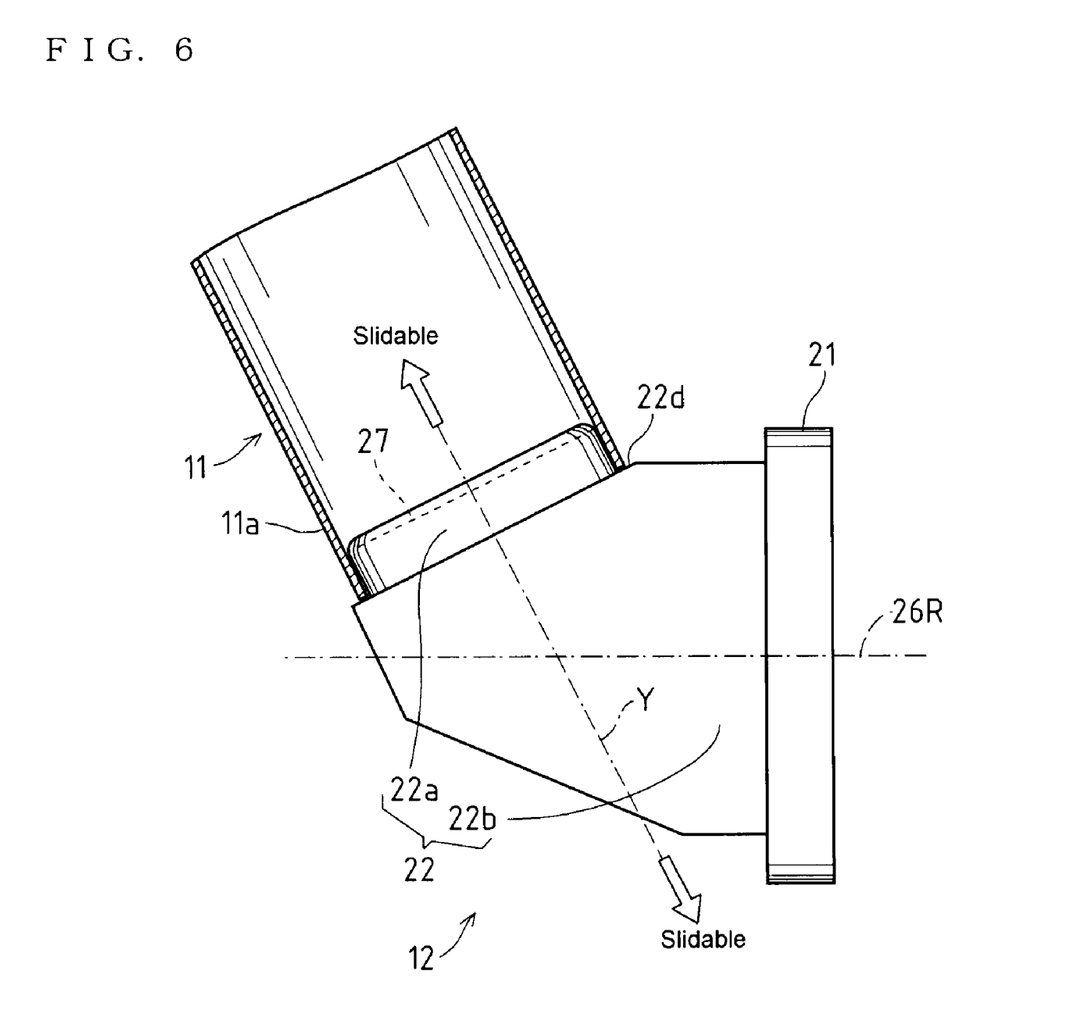
FIG. 6 is a view showing the attachment formed with a step.

The attachments 12R and 12L are moved independently, so that the dimensions DR and DL are adjusted independently and the specified dimensions are set easily. Alternatively, as shown in FIG. 6, the portion 22a of the carrier bracket 22 may have a step 22d as a stop which can fit to the open end 11a, so that the position of the arm 11R can be fixed.

As shown in FIG. 1, if the attachment 12R is set to the fixing jig, the alignment of the inclining of the axle 26R (the toe angle and the camber angle) is set positively. As shown in FIG. 4, the attachment 12R can be moved against the arm 11R, and the clearance exists between the arm 11R and the attachment 12R, which can be used as the alignment margin, so that the problems are prevented such as the heavy load put in the each component and bend of the each component, setting the alignment.

As shown in FIG. 4 and observed above structure, the arm 11R can be moved, so that the adjustment can be more freely, such as the setting of the axles 26R and 26L in the specified dimensions (the adjustment of the DR and DL) and the setting of the alignment (the toe angle, the camber angle), thereby the allowance can be enlarged, with the manufacture accuracy of each component involving the curving of the torsion beam 1.

As shown in FIG. 2 and observed above structure, in the state that the attachments 12R, 12L and the attachments 15R, 15L are positioned with respect to the pipe 10, they are welded to the pipe 10.

Figure 7:
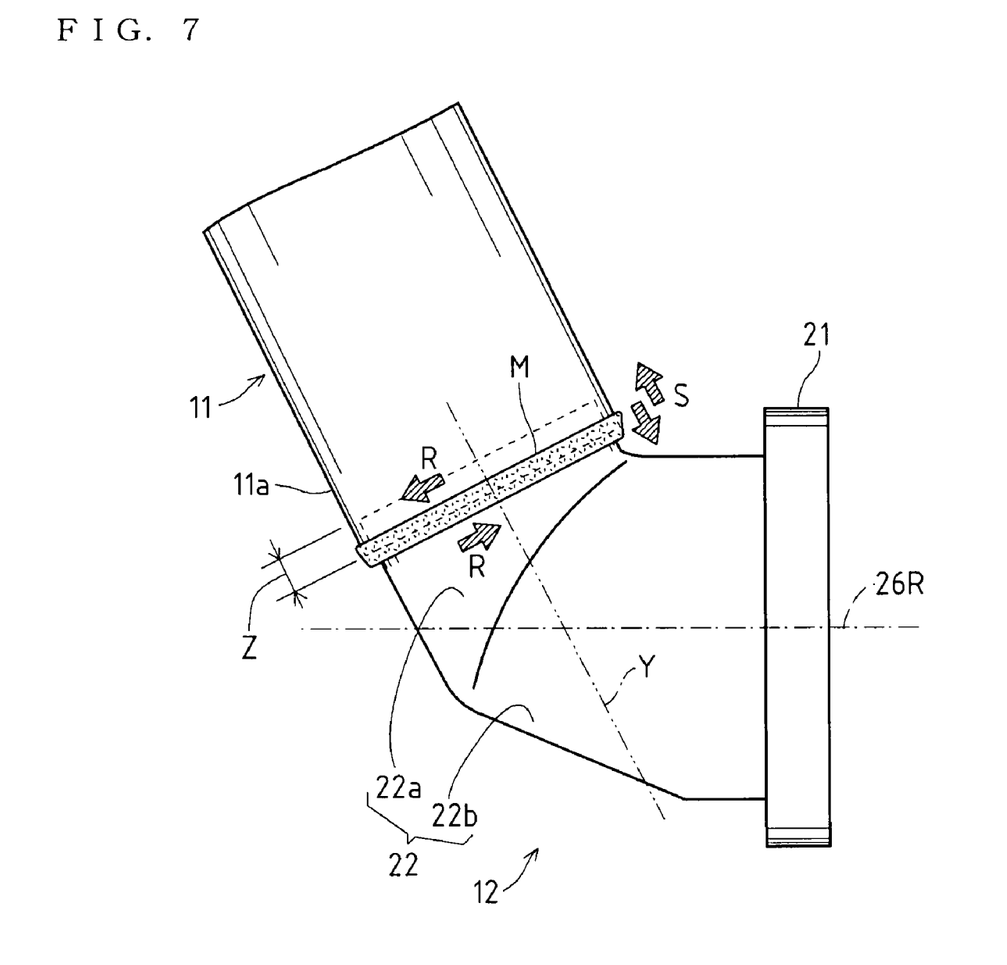
FIG. 7 is a view showing the position of the arm welded to the attachment.

As shown in FIG. 7, in the weld M (the all-around weld) between the attachment 15R and the arm 11R, the portion 22a is inserted to the open end 11a of the arm 11R, so that the wrap Z is existed between the portion 22a and the arm 11R. Thus, the clearance can be prevented from existing between the portion 22a and the arm 11R, so that the weld can be prevented from the burn through or the poor strength. Moreover, the weld quality as well as the product quality of torsion beam suspension can be improved.

As shown in FIG. 7, two loads act when the attachment 12 is moved to the pipe axis direction Y of the arm 11R (the load S) and when the attachment 12 is rotated to the pipe axis direction Y (the load R), and the both loads S and R act to the shear direction via the weld M between the portion 22a and the arm 11R. In the welding, the allowable load of the shear load is larger than that of the tensile load, so that reliability of the weld strength can be ensured in the structure assuming that the loads S and R act. In other word, the attachments 12 is inserted to the arm 11R, so that the wrap Z is formed definitely, and the deep fillet welding can be carried out, thereby the poor weld can be prevented, involving the burn through and ensuring the reliability of weld strength.

The embodiment of the present invention is described as the above construction.

As shown in FIGS. 1, 2 and 4, the torsion beam suspension includes the torsion beam 1 having the arms 11 R and 11L formed by bending both ends of the pipe 10 and the wheel attachments 12R and 12L inserted to the arms 11R and 11L, respectively, in which the inserted portions 22a of the attachments 12R and 12L are inserted to open ends 11a of the arms 11R and 11L, and the attachments 12R and 12L are welded to the arms 11R and 11L.

Due to the above structure, the arms 11R, 11L can be shortened by length of the wheel attachments 12R, 12L. Thus, the pipe 10 can be shortened, which is more expensive than a steel plate, so that the material cost can be reduced.

The arms 11R, 11L are not required for edge forming, so that the cost of forming can be reduced.

In the step before welding, the positions of the arms 11R, 11L can be adjusted. Thus, the manufacture accuracy of the torsion beam can be higher.

In the step before welding, the arms 11R, 11L can be moved against the open ends 11a, the adjustment with moving of the arms 11R, 11L achieves setting of the axles 26R, 26L in the specified dimensions (the adjustments of the DR, DL) and setting of the alignment (the toe angle and the camber angle).

According to the design for the wheel attachments 12R, 12L, the designs for a tread and the dimensions DR, DL are achieved, and in the torsion beam suspension, torsion beam 1 is shared and applied to the various vehicle involving the body easily.

As shown in FIG. 7, the weld is carried out between the inner peripheral of the open end 11a and the outer peripheral of the portion 22a.

Due to the above structure, the weld is carried out in the wrap Z between the portion 22a, 22a and the arm 11R, 11L, so that the problems are prevented such as the burn through or poor strength. Thus, the weld quality as well as the product quality of torsion beam suspension can be improved.

The fillet welding is carried out, the deep fillet welding can be carried out, so that the poor weld can be prevented, involving the burn through and ensuring the reliability of weld strength.

As shown in FIG. 4, the open end 11a is closed by the wheel attachment 12R (the cap 27).

Due to the above structure, the inner of the arm 11R can be prevented from rusting by wheel attachment, without the rust resisting or preparing the other member. Thus, the cost of them is cut.

As shown in FIGS. 1 and 4, the attachment 12R includes the carrier plate 21 for fixing a wheel carrier (not shown), in which the carrier plate 21 has the hole 26 penetrated thereto in the vehicle width direction W, and the carrier bracket 22 including the inserted portion 22a inserted to the each open end 11a of the arms 11R and the fixing portion 22b fixed to the carrier plate 21. In this structure, the open portion 11a is formed in the portion 22b and the open portion 11a and the hole 23 construct the shaft-penetrated portion 24.

Due to the above structure, the rear-wheel drive vehicle can be achieved. For example, the carrier bracket provided with the shaft-penetrated portion 24 is applied to either the front-wheel drive vehicle or four-wheel drive vehicle. Thus, the carrier bracket can be shared, so that easy management and cost reduction is achieved.

As shown in FIG. 5(a), in the portion 22a of the carrier bracket 22, the edge 22f of the portion 22a inserted to the open end 11a is formed by the diameter f1. The diameter f1 is smaller than the diameter d1 of the portion 22a.

Due to the above structure, the working performance can be improved when the portion is inserted to the open portion of the arm.

INDUSTRIAL APPLICABILITY

The present invention is applicable in the industrial instrument as the torsion beam suspension.

The invention claimed is:
1. A torsion beam suspension comprising:
  a torsion beam including a center portion, first and second arms formed by bending both ends of a pipe, and first and second curved portions connecting the first and second arms, respectively, to the center portion; and
  first and second wheel attachments attached to the first and second arms, respectively,
  wherein an axis of the first arm and an axis of the second arm are not parallel to an axis of the center portion,
  wherein a portion of the first and second wheel attachments is inserted to an open end of the first and second arms, respectively, and
  wherein the first and second wheel attachments are welded to the first and second arms, respectively.

2. The torsion beam suspension as set forth in claim 1, wherein the weld is carried out between the inner peripheral of the open end of the arm and the outer peripheral of the portion of the wheel attachment.

3. The torsion beam suspension as set forth in claim 1, wherein the open end of the arm is closed by the wheel attachment.

4. A torsion beam suspension comprising:
a torsion beam having arms formed by bending both ends of a pipe; and
wheel attachments attached to the each arms,
wherein a portion of the wheel attachment is inserted to an open end of the arm,
wherein the wheel attachments are welded to the arms, and
wherein the wheel attachment includes:
a carrier plate which fixes a wheel carrier, the carrier plate includes a hole penetrated thereto in a vehicle width direction; and
a carrier bracket, including a first portion inserted to the each open end of the arms and a second portion fixed to the carrier plate, an open portion is formed in the second portion and the open portion and the hole construct a shaft-penetrated portion.

5. The torsion beam suspension as set forth in claim 4, wherein the first portion has an edge, and a diameter of the edge is smaller than a nominal diameter of the first portion.

6. The torsion beam suspension as set forth in claim 1, wherein a diameter of the portion of the wheel attachment is smaller than an inner diameter of the open end of the arm.

7. The torsion beam suspension as set forth in claim 1, further comprising first and second body attachments welded to the first and second curved portions, respectively, and first and second bush portions provided at a free end of the first and second body attachments, respectively.

8. The torsion beam suspension as set forth in claim 7, wherein the first and second wheel attachments are slidable along the axes of the first and second arms, respectively, such that a longitudinal distance between the first and second wheel attachments and the first and second bush portions, respectively, is adjustable.

9. The torsion beam suspension as set forth in claim 1, wherein a step is provided on the portion of the wheel attachment which abuts against the open end of the arm.

* * * * *